United States Patent
Finn et al.

(10) Patent No.: US 6,186,093 B1
(45) Date of Patent: Feb. 13, 2001

(54) FOUR-WAY GATE ARRANGEMENT FOR FREESTALL BARN DRIVE-THROUGH

(75) Inventors: Todd Weiss Finn, Holland Patent; Gale W. Burdick, Poland, both of NY (US); Glenn Z. Horst, Denver; James L. Sensenig, Lebanon, both of PA (US)

(73) Assignee: Norbco, Inc., Westmoreland, NY (US)

(*) Notice: Under 35 U.S.C. 154(b), the term of this patent shall be extended for 0 days.

(21) Appl. No.: 09/431,946

(22) Filed: Nov. 1, 1999

(51) Int. Cl.[7] .................................................. A01K 29/00
(52) U.S. Cl. ........................ 119/14.03; 119/840; 119/524
(58) Field of Search .............................. 119/14.03, 840, 119/524

(56) References Cited

U.S. PATENT DOCUMENTS

| | | | |
|---|---|---|---|
| 3,703,884 | * 11/1972 | Maddalena et al. | 119/520 |
| 4,136,641 | * 1/1979 | Hoffman | 119/840 |
| 4,336,768 | * 6/1982 | Wagner | 119/840 |
| 4,599,972 | 7/1986 | Kilburn . | |
| 4,715,322 | 12/1987 | Johansson . | |
| 4,911,104 | 3/1990 | Abel . | |

OTHER PUBLICATIONS

Moeller, N.J, et al., Free–Stall Loose Housing for Dairy Cattle, ID–63, Purdue University Cooperative Extension Service (not dated).

Chastain, John, et al., Dairy Lighting System for Free Stall Barns and Milking Centers, AEU–12, Univ. of Minnesota Extension Service, Aug. 1996.

Hammond, Cecil, Dairy Free Stall Design, Circ 829, Univ. of Georgia Coll. of Ag. & Env. Sciences, Cooperative Extension Service, Oct. 1994.

Graves, Robert et al., Guideline for Planning Dairy Freestall Barns, DPC 1 NRAES–76, Northeast Regional Agricultural Engineering Service Coop. Ext., Oct. 1995.

\* cited by examiner

Primary Examiner—Peter M. Poon
Assistant Examiner—Yvonne R. Abbott
(74) Attorney, Agent, or Firm—Bernhard P. Molldrem, Jr.

(57) ABSTRACT

A freestall barn for dairy cattle arranged with a plurality of freestall resting areas with resting stalls, and a feed alley; has a feed drive through for a feed delivery vehicle, with feed alleys of the freestall resting areas adjacent and parallel to the feed drive-through. A cow lane crosses the feed drive through forming an intersection with it. The cow lane connects the freestall resting areas, and permits cows to proceed to and from a milking station. A four-way drive-through gate assembly has four horizontal gates disposed to pivot or swing on vertical axes at respective corners of the intersection. In a first position the gates block the drive-through but permit passage of cows along the cow lane. In a second position the gates block the cow lane but permit the feed delivery vehicle to pass through along the drive-through. A mechanically linkage mechanism moves the gates between their first and second positions, such that the gate disposed diagonally opposite one another rotate in the same direction and the gates disposed adjacent one another rotate in opposite directions. Two of the gates are have a narrow axial span relative to the other two gates, and the latter two gates each have an opening therein wide enough to permit a one of the narrow gates to penetrate through it when the assembly is moved between positions.

12 Claims, 7 Drawing Sheets

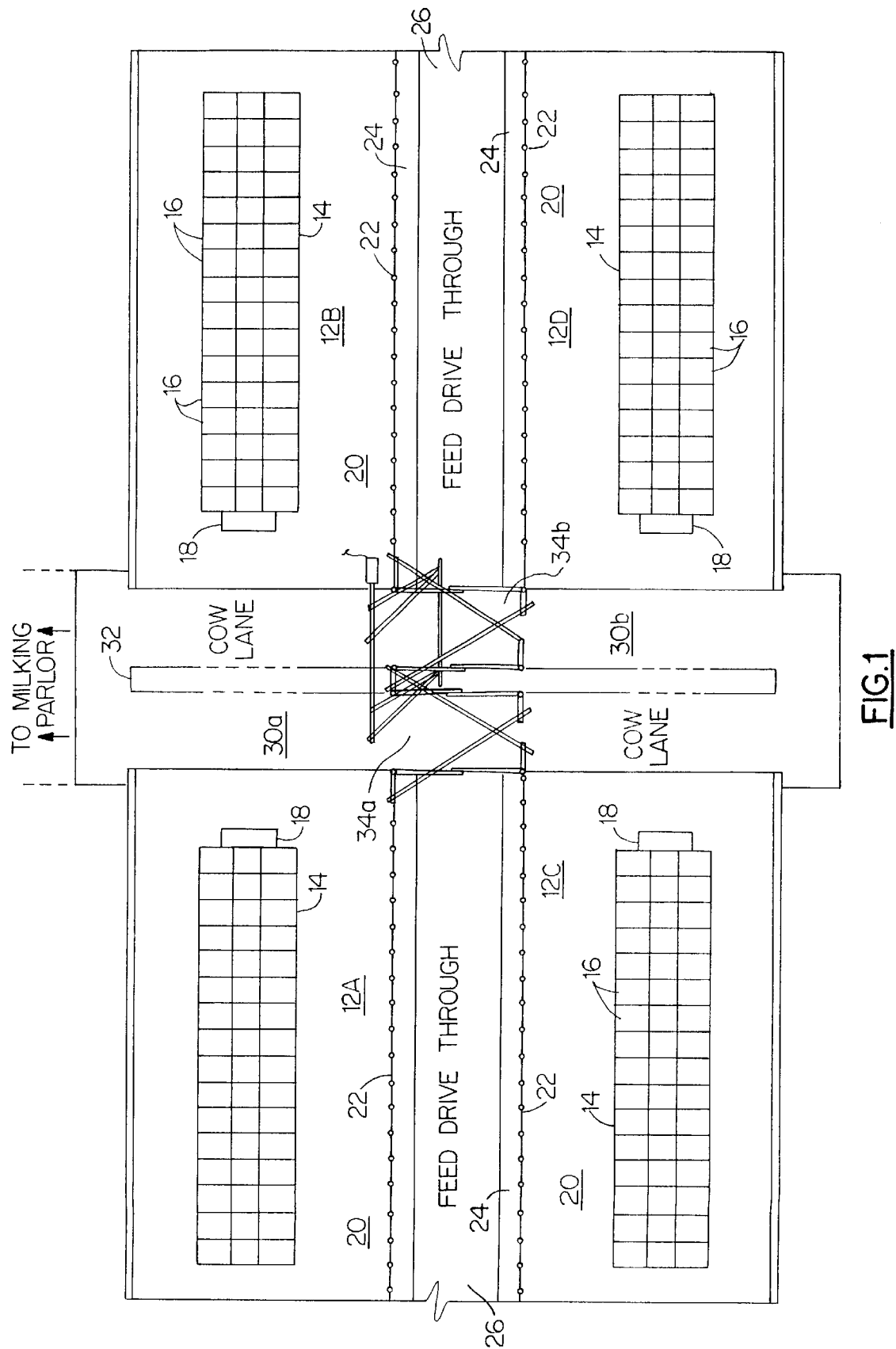

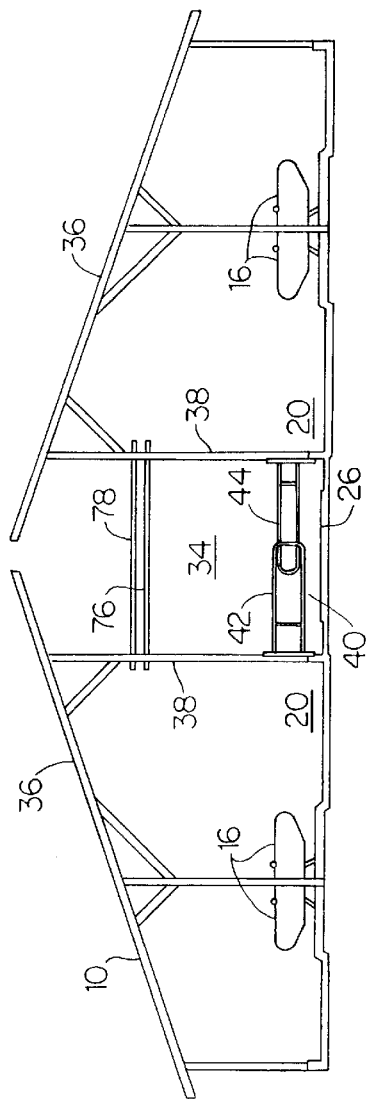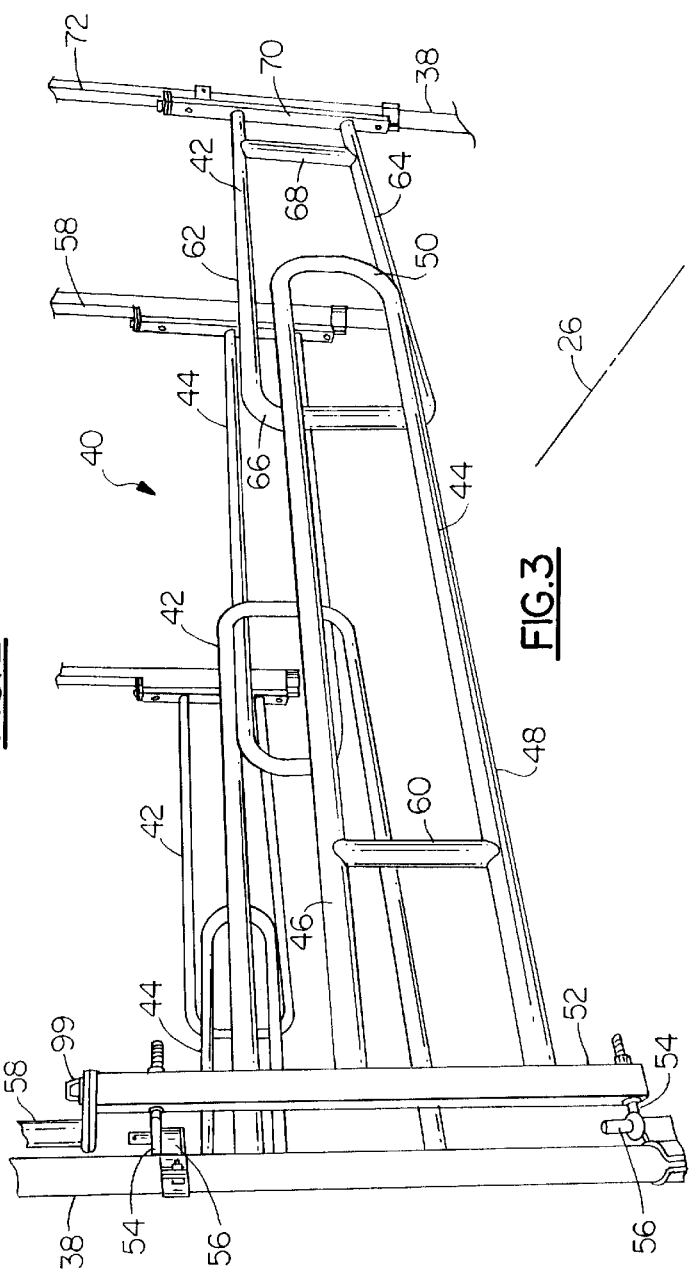

FOUR-WAY GATE ARRANGEMENT FOR FREESTALL BARN DRIVE-THROUGH

BACKGROUND OF THE INVENTION

This invention relates in general to dairy cattle housing, and is more particularly directed to a gate arrangement for controlling the intersection of a feed drive-through with a cow lane in a freestall barn. The invention is more particularly concerned with an improved gate arrangement that facilitates driving the feed delivery vehicle along the feed drive-through or feed driveway, and which allows the cow lane or lanes to be closed off when need be so that the cows (do not wander onto the drive-through.

Freestall dairy barns, also known as loose housing, have become an attractive option for dairy farmers who want to maintain and manage a large dairy herd. The advantages of the freestall housing system over other confined herd arrangements, such as tie stall barns, are well known. These include reduction of bedding per cow, less space per cow, ease of manure removal, reduced udder washing time before milking, higher milk quality, and less frequent udder injury. A fleestall barn requires a building design that is similar to conventional loose housing, but with stalls and lanes constructed to define resting areas, watering areas, feed areas, and cow lanes for the cows to walk to and from a milking center. In the resting areas, freestalls arc arranged in parallel rows with adjacent concrete alleys that provide safe, convenient passages for the cows to other parts of the freestall barn and other parts of the housing system. The alleys have gutters or other means for collection of manure, which is flushed into a manure handling tank. Each resting area also has a feed alley where the cows feed themselves. These are normally located adjacent and parallel to a feed drive-through or feed driveway. There is a barrier between the feed alley and the drive-through, which can include a row of feed stanchions. A feed table of about 2 to 3 feet in width lies along the barrier on the drive-through side, and the cows can place their necks and heads over the barrier to eat the feed that is distributed on the feed table. Normally, a feed vehicle is driven along the drive-through once or several times a day to bring in the feed, and the feed is spread out on the feed tables that lie along both sides of the feed drive-through.

The milking of the cows is carried out at a milking parlor located outside the barn. A single milking parlor can service several freestall barns. Cow lanes connect the various resting areas in the barn with the milking parlor. Because cow resting areas are located on both sides of the feed drive-through, the cow lanes have to cross the feed drive-through. Also, to keep the travel distance to a minimum and to permit groups of cows to be moved easily between the barn and the milking parlor, the cow lanes leading to the parlor are best located at the center of the barn, crossing the feed drive-through at the center.

Gates and fences are needed to funnel and direct the cows, and at the intersection of the cow lane(s) with the drive-through, a gate is necessary to prevent the cows from walking onto the drive-through. On the other hand, the gates must be opened to permit the feed delivery vehicle to pass along the drive-through. To date, there has been no gate arrangement proposed that would facilitate opening of the gate at the crossing of the cow lane, but which can reliably keep the cows from wandering onto the feed drive-through. There has been no gate arrangement that is automated or mechanized so that the gates can be opened and closed by the driver of the feed delivery vehicle.

Several freestall arrangements for housing cows are described in the literature. For example, dividers for freestall barns are described in Abel U.S. Pat. No. 4,911,104, a portable free stall module is described in Kilbum U.S. Pat. No. 4,599,972, and a related stall construction for a free stall barn is described in U.S. Pat. No. 4,715,322. As a matter of background, general guidelines for constructing and employing freestall barns for a dairy herd are found in Robert E. Graves. Guideline for Planning Dairy Freestall Barns, Northeast Regional Agricultural Engineering Service Cooperative Extension, Ithaca N.Y., 1995. Other useful background information can be found in Moeller et al., Free-Stall Loose Housing for Dairy Cattle, ID-63, Purdue University Cooperative Extension Service; Ilam.nond, Dairy Free Stall Design, University of Georgia College of Agricultural and Environmental Services Cooperative Extension Service; and Chastain et al., Dairy Lighting System for Free Stall Barns and Milking Centers, Pub. AEU-12, University of Minnesota Extension Service, Department of Biosystems and Agricultural Engineering, August 1966.

OBJECTS AND SUMMARY OF THE INVENTION

Accordingly, it is an object of this invention to provide a four-way agate arrangement for a freestall dairy barn which overcomes the drawbacks of the prior art.

It is another object to provide a gate arrangement for the intersection of the feed drive-through with one or more cow lanes, and which can be conveniently moved between a position in which the cow lanes are open and another position in which the feed drive-through is open, and which is configured to keep cattle from escaping from the cow lanes into the drive-through when the gate arrangement is moving between positions.

It is a further object to facilitate the distribution of feed to the cows in the freestall barn, and to enable the feed delivery truck driver to open and close the gates without leaving the vehicle.

It is a still further object to provide a gate arrangement that prevents cows from wandering onto the feed drive-through.

In accordance with an aspect of the present invention, a freestall barn for dairy cattle is provided with a four-way gate drive-through gate arrangement. The barn comprises a plurality of freestall resting areas each of which includes resting stalls and at least one feed alley; a feed drive-through adapted for passage of a feed deliverer vehicle and disposed in the barn such that the feed alleys of the freestall resting areas are adjacent to and parallel to the feed drive-through; and at least one cow lane crossing the feed drive-through at an intersection thereof and extending between the freestall resting areas. The cow lane permits cows to proceed between the freestall resting areas and to and from a milking station. The four-way drive-through gate assembly has four swinging gates disposed to pivot on vertical axes at respective corners of the intersection. The gates are movable between a first position in which the gates block the drive-through but permit passage of cows along the cow lane, and a second position in which the gates block the cow lane but permit passage of the feed delivery vehicle along the feed drive-through.

The four-way drive-through gate assembly further includes linkage means for mechanically linking the four gates so that when the gates are moved between the first and second positions, the gates disposed diagonally opposite one another rotate in the one direction and the gates disposed adjacent one another rotate in opposite directions (e.g., gates one and three move clockwise while gates two and four move counterclockwise).

In one favorable arrangement, there is also a second cow lane parallel to the cow lane mentioned above, and which crosses the drive-through so that there is a second intersection. In this case, the four way drive-through gate assembly can include a second four gates disposed to pivot at respective corners of this second intersection. A linkage joins the second four gates with the first-mentioned four gates so that when the first-mentioned four gates are situated in their first position the second four gates similarly block the feed drive-through, and when the first-mentioned four gates are disposed in their second position the second four gates similarly block the second cow lane.

The gates each have a radial (i.e., horizontal) length of substantially half the diagonal distance across the intersection, so that the gates very nearly meet when they are halfway between their first and second positions. This avoids creating an opening or passage for cows to walk through, and keeps cows out of the feed drive-through. In a favorable embodiment, the gates are of tubular construction, with each comprising upper and lower tubes and a U-shaped distal end joining the upper and lower tubes. The first and third gates have a narrow radial span across the upper and lower tubes) relative to the second and fourth gates, and the second and fourth gates each have an opening (between the upper and lower tubes) wide enough to permit a respective one of said first and third gates to penetrate through the gate when the assembly is moved between its first and second positions.

The mechanical linkage means for moving the gates can include, for each of the first through fourth gates, a vertical torque tube disposed along the associated vertical axis, and an arm affixed to the respective torque tube and extending radially (e.g., horizontally) therefrom. A first rigid connecting rod joins the arms of the first and third gates; a second rigid connecting rod joins the arms of the second and fourth gates. In this way, the first gate is synchronized to swing together with the third gate and in the same direction, while the second gate is synchronized to swing together with the fourth gate and in the same direction as the second gate. A synchronized drive means, which can include another connecting bar, serves to drive the arms and connecting rods such that the first and third gates swing together with the second and fourth gates but in opposite respective directions. These can be operated with a remotely controlled drive mechanism, with a linear drive unit, similar to overhead door openers, in which a remote-control unit can be mounted on the vehicle for the driver's use in opening and closing the gates. Alternatively, a vehicle presence detector can be used for automatically opening the gates across the drive-through when the vehicle approaches and closing them when the vehicle has passed through the intersection.

The above and many other objects, features, and advantages of this invention will become apparent from the ensuing detailed description of a preferred embodiment, which should be read in connection with the accompanying Drawing.

BRIEF DESCRIPTION OF THE DRAWING

FIG. 1 is a plan view of a freestall dairy barn showing the intersection of cow lanes with a feed drive-through, and showing a four-way gate arrangement according to an embodiment of this invention.

FIG. 2 is an end elevation of the freestall dairy barn of FIG. 1, showing the gate arrangement across the feed drive-through.

FIG. 3 is a perspective view showing the four-way gate arrangement of the is embodiment, with the gates in their first position disposed across the feed drive-through.

DETAILED DESCRIPTION OF THE PREFERRED EMBODIMENT

Figure 4:
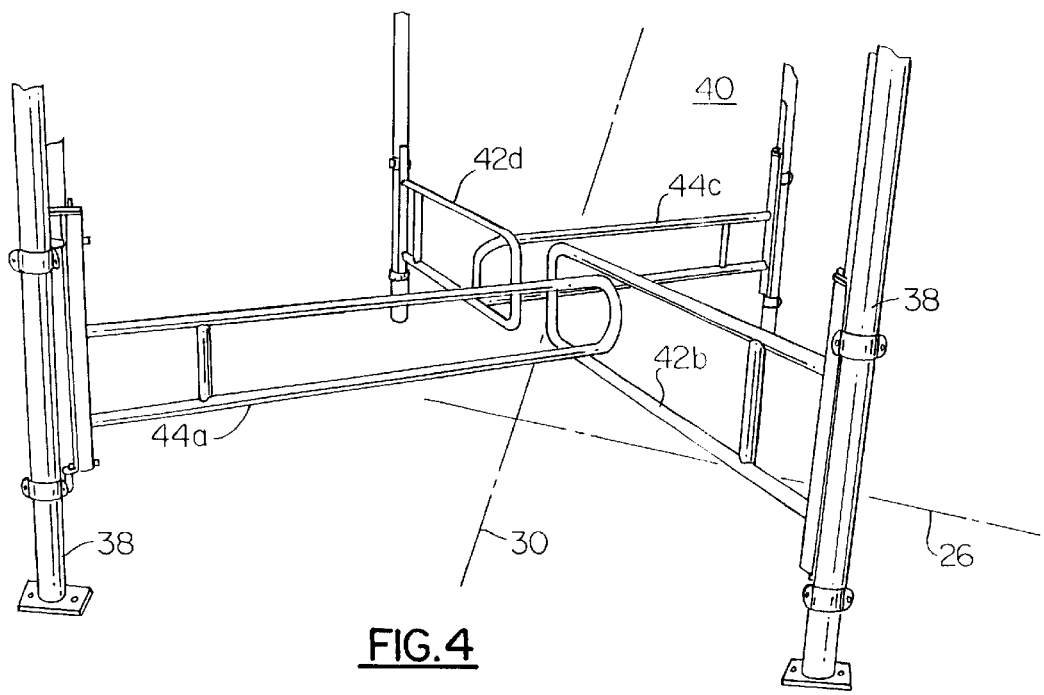
FIG. 4 is a perspective view showing the gates moving between their first and second positions.

With reference now to the Drawing, and initially to FIGS. 1 and 2, a freestall dairy barn 10 has a number of freestall areas 12 where the cows feed and rest. Here there are four areas 12A, 12B, 12C, and 12D. Each of the areas has a resting area 14 for the cows, where there are resting stalls 16, a watering facility 18, and a feed alley 20. The cows are free to walk about the barn 10, and when hungry they can proceed from the resting area 14 to the feed alley. There is a curb 22 at the edge of the feed alley 20, and this curb 22 can have stanchions to define feeding stations. A feed table 24 is situated parallel to the feed alley 20 and just beyond the curb 22. This feed table 24 is about two to three feet wide and extends the length of the feed alley.

A feed drive-through or feed driveway 26 extends for the length of the barn 10 and is situated between the feed alleys for the freestall areas 12A and 12C and between areas 12B and 12D. This drive-through 26 is used for driving a feed distribution vehicle (not shown) through the barn periodically. Feed for the cows is spread onto the feed tables 24 when the vehicle passes through.

A cow lane 30 extends through the barn 10 at right angles to the feed drive-through 26, and provides a walkway for cows between the resting areas and from the resting areas to a milking parlor. While not specifically shown here, the milking parlor can be part of a milking center and in this embodiment is located on the side that is at the top of the drawing view. On the other side of the barn 10, i.e., below the drawing page, there can be one or more additional similar freestall barns connected by means of the cow lane 30.

In this case there is a double cow lane, i.e., two parallel cow lanes 30A, 30B. A manure channel 32 is situated between the two cow lanes 30A and 30B. Cow waste is scraped into the manure channel 32, and is flushed into a holding tank (not shown).

The cow lanes 30A and 30B cross the feed drive-through 26 at respective intersections 34A and 34B.

As shown in FIG. 2, the barn 10 has a roof 36 and a plurality of support posts 38, including support posts 38 at each corner of the two intersections 34A, 34B.

Figure 5:
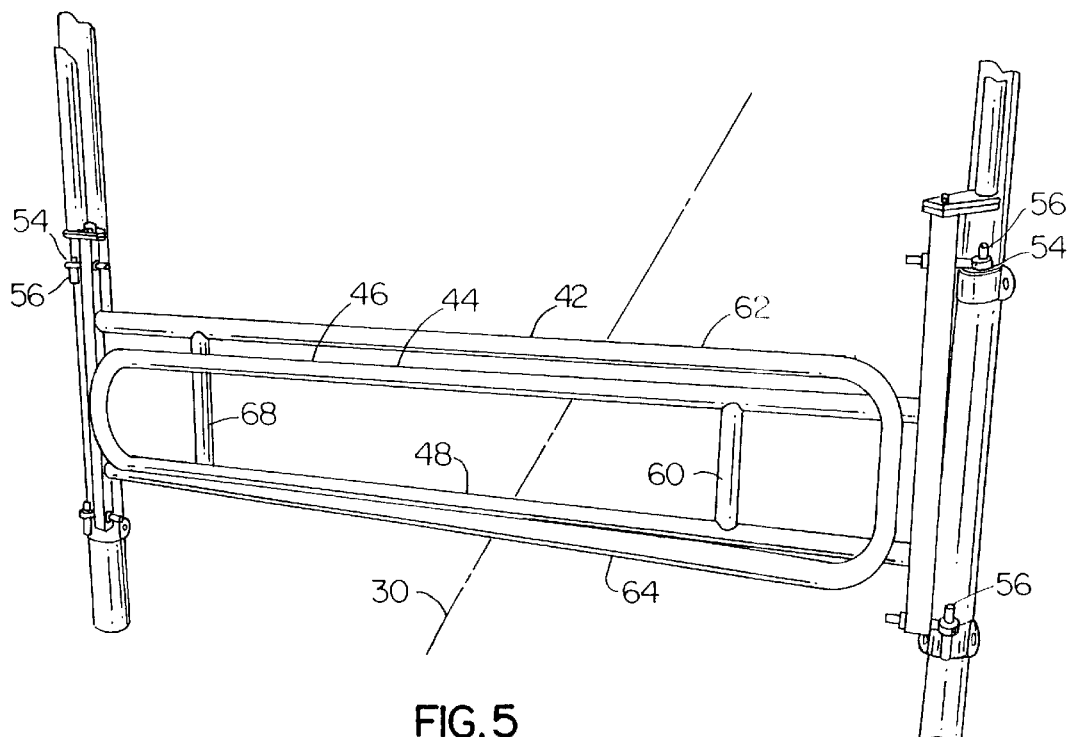
FIG. 5 is a perspective view showing the gate arrangement of this embodiment in their second position across the associated cow lane.

A four-way gate arrangement 40 is disposed at each of the two intersection 34A and 34B, each having a pair of wide gate members 42 and a pair of narrow gate members 44, that swing on respective vertical axes. One half of one gate arrangement and the full second gate arrangement 40 for the two intersections 34A, 34B is shown in FIG. 3. Dash lines shown the orientation of the gate arrangement relative to the cow lane 30 and the feed drive-through 26. In FIG. 3, the gate arrangement is shown in its first position, i.e., with the cow lanes 30A, 30B open and the feed drive-through 26 blocked. FIG. 4 shows the gate arrangement 40 in the process of moving between their first and second positions. FIG. 5 shows the gate arrangement 40 in the second position, i.e, with the cow lanes blocked, but open along the feed drive-through to permit the feed delivery vehicle to pass through the intersection.

Here, the narrower gate member 44 is shown formed of a horizontally disposed upper tube 46 and a lower tube 48 parallel to it, with a generally U-shaped nose portion 50 connecting the tubes 46, 48 at their distal ends. The width of the gate members 44, i.e., the vertical or axial distance from the bottom of tube 48 to the top of tube 46, is somewhat smaller than the axial width of the wider gate members 42. The proximal ends of the tubes 46, 48 are affixed to a vertical base post 52, on which are attached pivot eyes 54 that rest upon vertical pivot pins 56 that are, in turn, mounted on a respective vertical support post 38. These pins 56 define a vertical pivot axis. A torque tube 58 extends vertically along the pivot axis. Also, there is a vertical brace tube 60 between the tubes 46, 48 near their proximal ends.

The wider gate member 42 is likewise formed of an upper tube 62 and a lower tube 64, with a generally U-shaped nose portion 66 joining them at the distal ends, and with a vertical brace tube 68 near the proximal ends. A base post 70 is affixed to the proximal ends of the tubes 62, 64, and is pivotally mounted to a respective support post 38, using pivot eyes 54 and pivot pins 56 as mentioned previously. Also, a torque tube 72 extends upward on the vertical pivot axis for the gate member 42. The space between the upper and lower tubes 62, 64 is somewhat greater than the width of the narrower gate member 44. This permits the gate member 44 to penetrate the gate member 42 when the gates swing from position to another.

The gate members 42, 44 each have a length of about one-half the diagonal distance across the respective intersection 34A or 34B, so that the gate members nearly meet at the center of the intersection when they are moved between positions. When the gates are in their first positions, i.e., with the cow lane open and the drive-through blocked, or in their second positions, i.e., with the drive-through open and the cow lane blocked, the wide and narrow gate members 42, 44 overlap. This construction prevents cows from walking between the gate members when the gate assembly is partly opened, and going from the cow lane onto the feed drive-through. If a cow is standing in the intersection 34A or 34B when the gate arrangement 40 starts to go from the first to the second position, the gate members will gently nudge her back onto the cow lane 30A or 30B.

Figure 6:
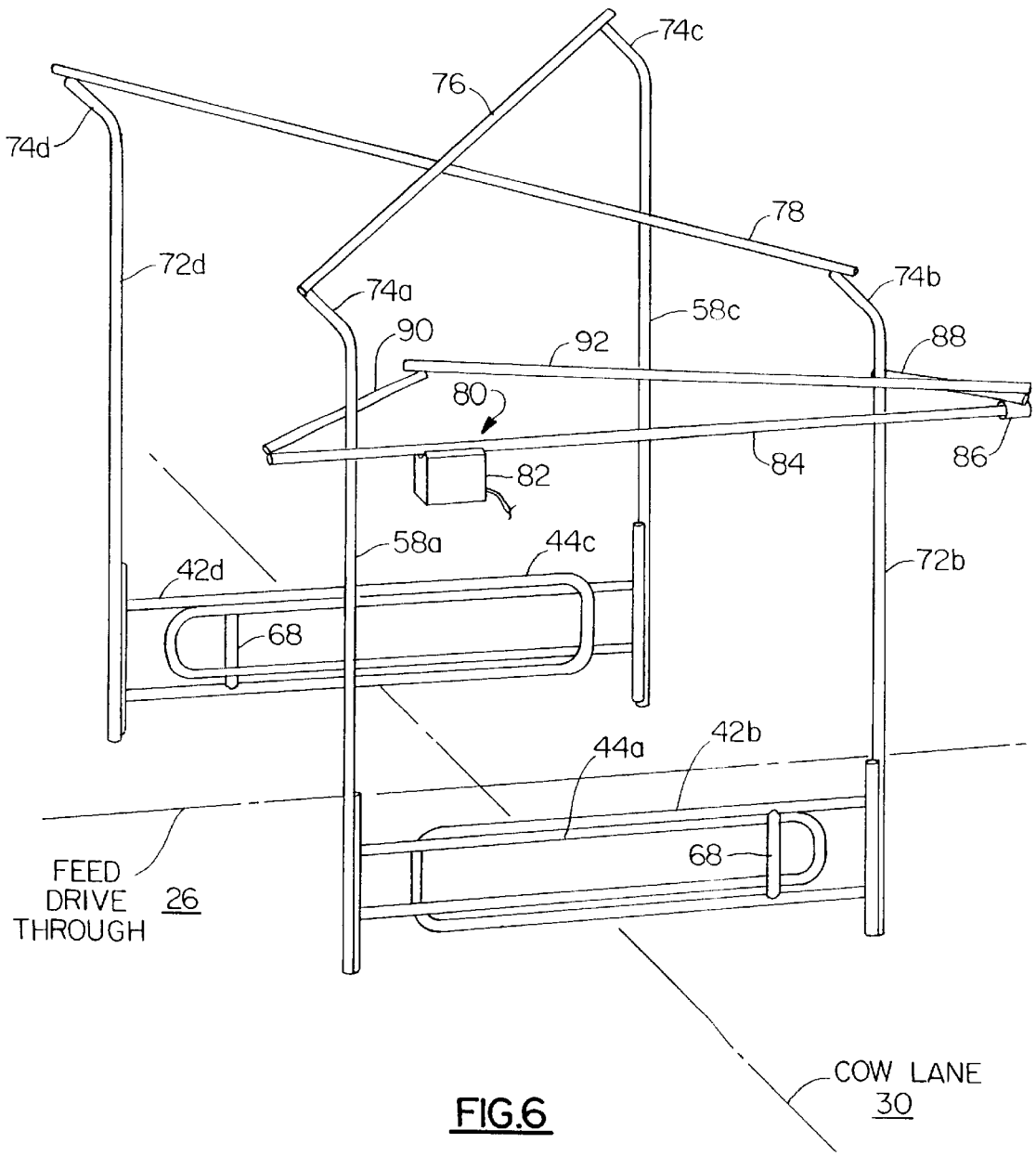
FIG. 6 is a perspective view showing the vertical torque tubes, swing arms, and connecting bars of linkage mechanism of the gate arrangement of this embodiment.
Figure 7:
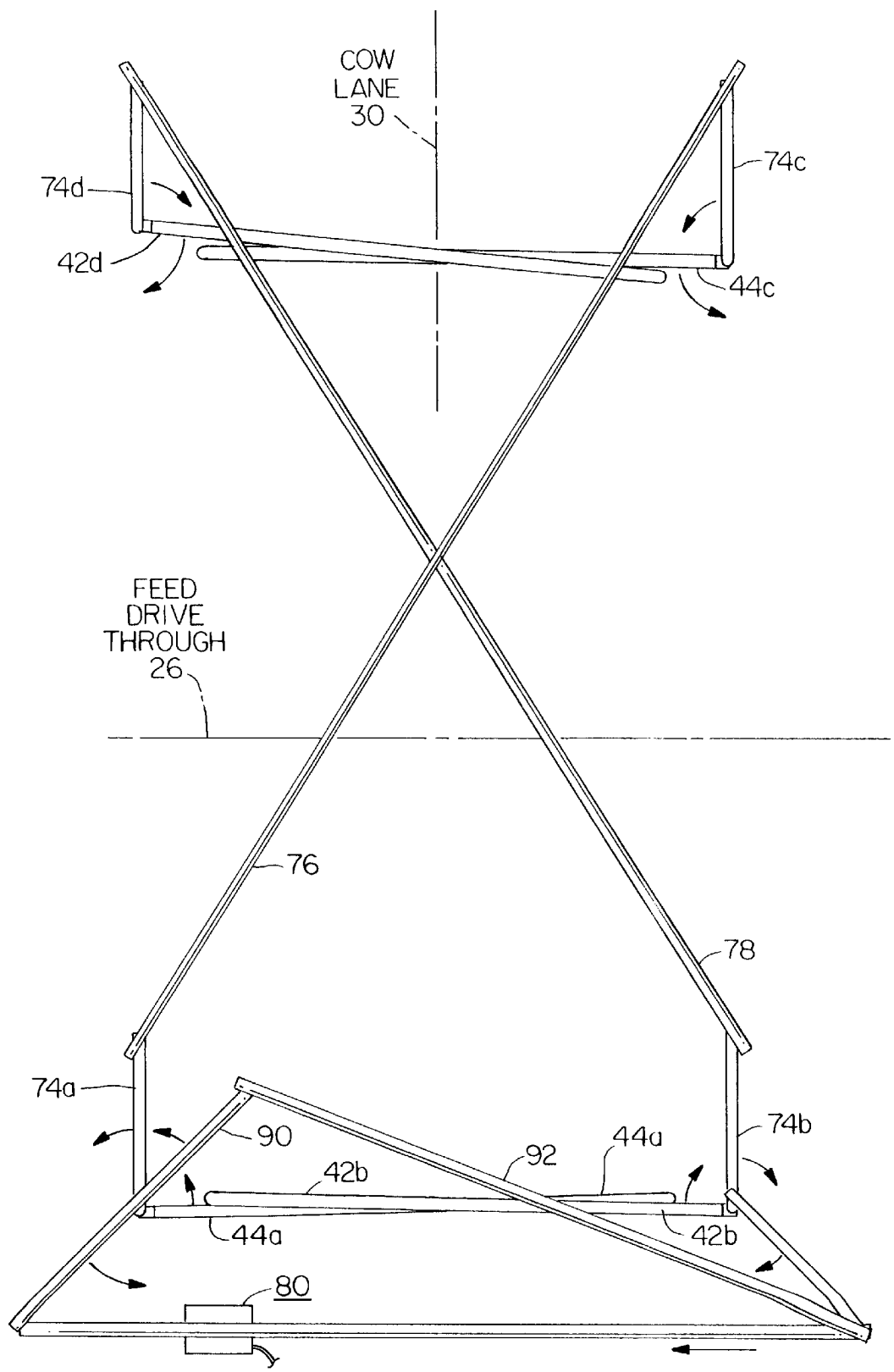
FIGS. 7 and 8 are top plan views of the linkage mechanism of FIG. 6, shown in the first and second positions.
Figure 8:
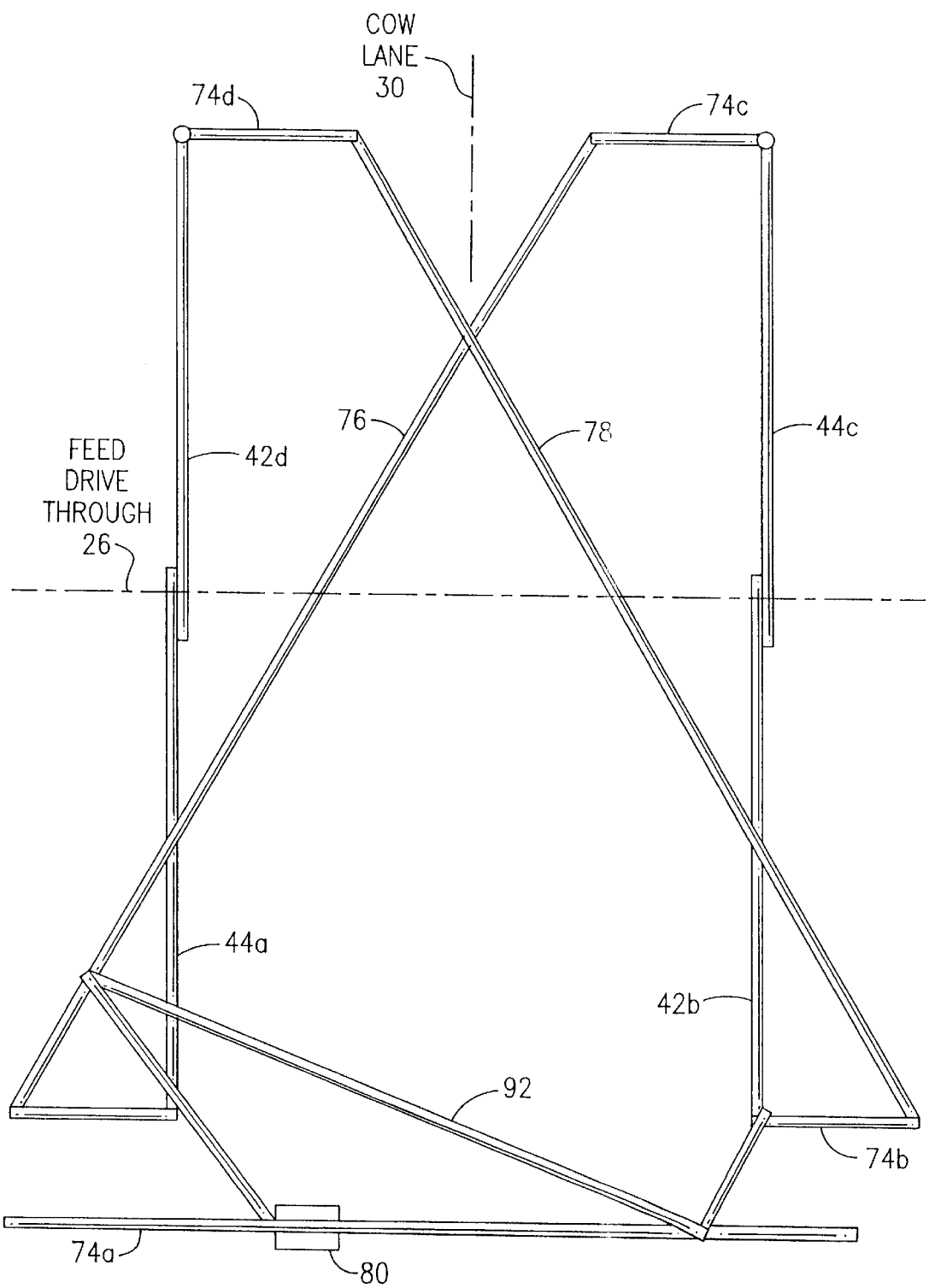

FIGS. 6 to 8 show one of many possible arrangements of synchronizing linkages for swinging the gate members 42, 44. For sake of simplicity these views show only a single gate arrangement for a single intersection of one cow lane 30 with one feed drive-through 26. Here, the gate members are identified in counter-clockwise order as 44a, 42b, 44c, and 42d, Respective torque tubes 58a, 72b, 58c, and 72d are associated with these gate members, and each has an associated swing arm or lever arm 72a, 72b, 72c, and 72c at its upper end. A rigid tube or connector bar 76 connects the ends of the swing arms 74a and 74c, while another rigid tube or connector bar 78 joins the ends of the other swing arms 74b and 74d.

A linear drive mechanism 80 has a motor drive 82, with a remote control (not shown), which can be coupled by cable or wireless means. A horizontal support tube 84 contains a chain drive or screw drive or other well known drive mechanism to propel a traveller 86 linearly along the support tube 84. A lever arm 88 is attached to the torque tube 72b and to the traveller 86, so that motion of the traveller 86 rotates the gate members 42b and 42d. Another lever arm 90 is attached to the torque tube 58a, and another rigid connecting tube or bar 92 connects with the first lever arm 88. This rotates the gate members 44a and 44c. Here it should be observed that the gate members 44a and 44c, which are disposed diagonally opposite one another, both turn together in the same direction. The other gate members 42b and 42d, which are also disposed diagonally opposite each other, rotate in the same direction, but in the opposite sense to that of the gate members 44a and 44c. Adjacent gate members turn in opposite directions.

Figure 9:
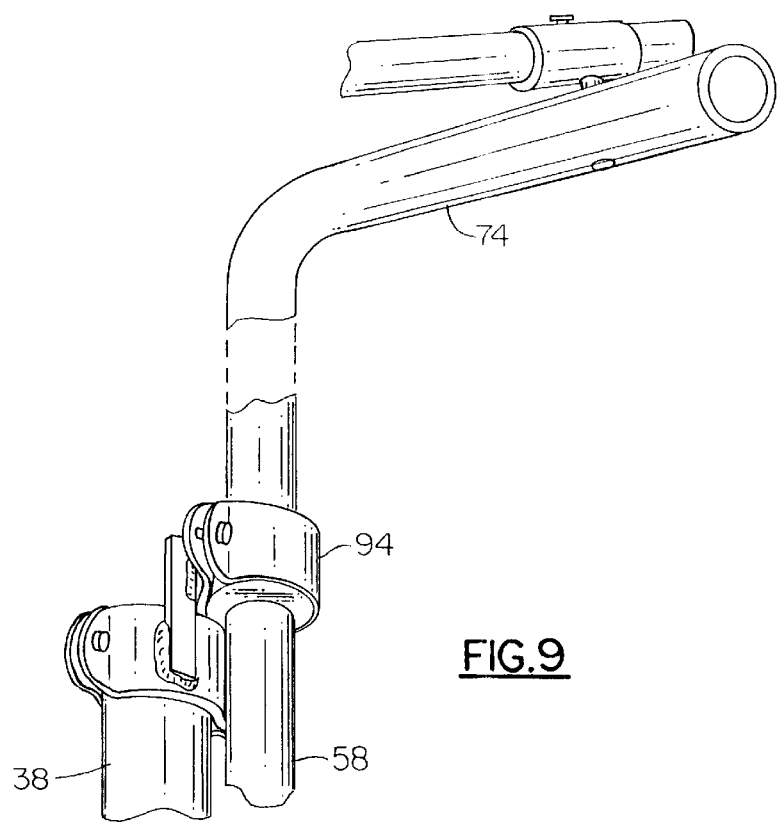
FIGS. 9 and 10 show details of the linkage mechanism of this embodiment.
Figure 10:
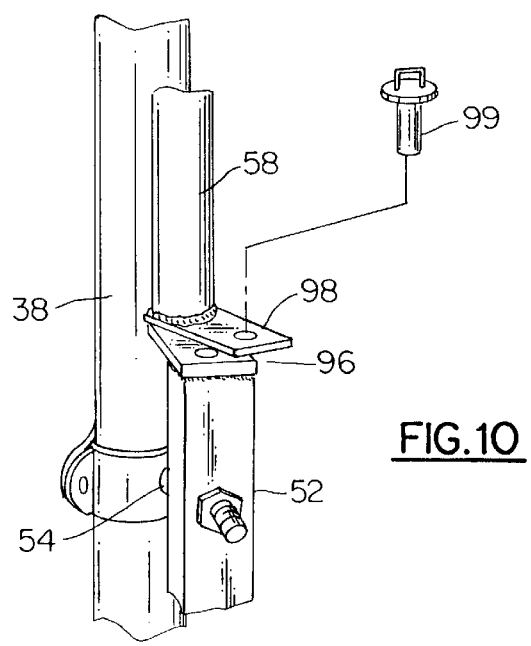

FIG. 9 illustrates a top portion of the torque tube 58, showing the associated swing arm 74 at right angles to the tube 58, and showing a support bearing 94 that journals the torque tube 58. FIG. 10 illustrates the lower end of the torque tube 58, which is seen to be disposed on the vertical pivot axis, as defined by the pivot eyes 54 and pivot pins 56, i.e., behind the base post 52. There is a horizontal lower plate 96 affixed to the base post 52 and a horizontal upper plate 98 affixed to the base of the torque tube 58. A removable pin 99 is seated in a hole that penetrates both these plates 98, 96. The pin can be pulled out to allow the gate member 44 to be opened manually, for example, to retrieve a cow that has wandered onto the feed drive-through 26.

As shown generally in FIG. 1, the synchronizing linkages for both sets of gates, i.e., for both intersections 34A, 34B, can be driven together using the same drive mechanism. Also, instead of the system as shown with the connecting tubes 76, 78, etc., a different synchronized drive movement could be employed, for example based on a gearing mechanism, a chain drive, pneumatic or hydraulic actuators, or many other well-known drive means.

With the four-way gate arrangement of this invention, the driver of the feed delivery vehicle can operate the gates without needing to dismount from the vehicle, and without having to employ a helper to open and close the gates. There is very low risk of injury to personnel or to the cows. The gate arrangement keeps cows on the cow lanes and prevents them from entering onto the feed driveway or drive-through. The mechanism is reliable and simple to maintain and to repair, and can be conveniently installed during barn construction or in an existing free stall barn.

The invention has been described herein with reference to a single preferred embodiment, but the invention is not limited to that embodiment. Rather, many modifications and variations will become apparent to persons skilled in the art without departing from the scope and spirit of this invention, as defined in the appended claims.

We claim:

1. A freestail barn for dairy cattle arranged with a plurality of freestall resting areas each of which includes resting stalls and at least one feed alley; a feed drive through adapted for passage of a feed delivery vehicle and disposed in the barn such that the at least one feed alley of the freestall resting areas are adjacent to and parallel to the feed drive through; at least one cow lane crossing the fed drive through at an intersection thereof and extending between said freestall resting areas, said cow lane permitting cows to proceed between the freestall resting areas and also to and from a milking station; and a four-way drive through gate assembly having four swinging gates disposed to pivot at respective corners of said intersecton, and movable between a first position in which said gates block said drive through but permit passage of cows alone said cow lane, and a second position in which said gates block said cow lane but permit passage of said feed delivery vehicle along said drive through.

2. A freestall barn according to claim 1 wherein said four-way drive through gate assembly further includes linkage means for mechanically linking said four gates such that when the gates are moved between the first and second positions, the gates disposed diagonally opposite one another rotate in the same direction and the gates disposed adjacent one another rotate in opposite directions.

3. A freestall barn according to claim 1 wherein a second cow lane parallel to the first-mentioned cow lane crosses said drive through to define a second intersection, and said four-way drive through gate assembly includes a second four gates disposed to pivot at respective corners of said second intersection; and means linking the second four gates with the first-mentioned four gates so that when the first mentioned four gates are disposed in their first position the second four gates similarly block said feed drive through, and when the first-mentioned four gates are disposed in their second position the second four gates similarly block said second cow lane.

4. A freestall barn according to claim 1 wherein said four gates include first and third gates that have a narrow vertical span and second and fourth gates that have a wider vertical span and each have an opening therein wide enough to permit one of the first and third gates to penetrate therethrough in transit between the first and second positions.

5. A freestall barn according to claim 1 comprising a remotely-controlled motorized mechanism for moving said four-way drive through gate assembly between its first and second positions.

6. Four-way gate arrangement adapted for installation at an intersection of a cow lane, on which cows walk between resting and feeding areas and a milking station, and a feed drive through on which a feed delivery vehicle is driven; the gate arrangement comprising first, second, third, and fourth swinging gates pivotally mounted on respective vertical axes disposed at first through fourth corners of said intersection, with said first and third gates being disposed diagonally across from one another and with said second and fourth gates being disposed diagonally across from on another; and mechanical linkage means for moving said first through fourth gates between a first position in which said gates block said drive through but permit passage of cows along said cow lane, and a second position in which said gates block said cow lane but permit passage of said feed delivery vehicle along said drive through.

7. Four-way gate arrangement according to claim 6 wherein said intersection has a diagonal distance thereacross, and each of said gates has an radial length of substantially half said diagonal distance so as to avoid creating a cow passage when said gates transit between their first and second positions.

8. Four-way gate arrangement according to claim 6, wherein said mechanical linkage means includes for each of said first through fourth gates a vertical torque tube disposed on the associated vertical axis and an arm affixed to the respective torque tube and extending radially therefrom; a first rigid connecting rod joining the arms of the first and third gates; a second rigid connecting rod joining the arms of the second and fourth gates; such that the first gate is synchronized to swing together with the third gate and in the same direction therewith, and the second gate is synchronized to swing together with the fourth gate and in the same direction therewith; and synchronized drive means for driving said arms and connecting rods such that the first and third gates swing together with the second and fourth gates but in the direction opposite thereto.

9. Four-way gate arrangement according to claim 8, wherein said drive means includes a remotely controlled motorized mechanism for mechanically driving said gate assembly between its first and second positions.

10. Four-way gate arrangement according to claim 6, wherein said first and third gates have a narrow axial span relative to the second and fourth gates, and the second and fourth gates each have an opening therein wide enough to permit a respective one of said first and third gates to penetrate therethrough when the assembly is moved between its first and second positions.

11. Four-way gate arrangement according to claim 10, wherein said gates each comprise upper and lower tubes and a U-shaped distal end joining the upper and lower tubes.

12. Four-way gate arrangement according to claim 11, wherein said second and fourth gates each further comprise a vertical bar joining their upper and lower tubes.

* * * * *

UNITED STATES PATENT AND TRADEMARK OFFICE
CERTIFICATE OF CORRECTION

PATENT NO. : 6,186,093 B1  Page 1 of 1
DATED : February 13, 2001
INVENTOR(S) : Finn et al.

It is certified that error appears in the above-identified patent and that said Letters Patent is hereby corrected as shown below:

Column 1,
Line 12, "(do" should read -- do --.
Line 21, "fleestall" should read -- freestall --.
Line 25, "arc" should read -- are --.

Column 2,
Line 2, "Kilbum" should ead -- Kilburn --.
Line 12, "Ilam.nond" should read -- Hammond --.
Line 23, "agate" should read -- gate --.
Line 45, "deliverer" should read -- delivery --.

Column 3,
Line 66, "arrangement of the is" should read -- arranagement of this --.

Claims,
Column 6, claim 1,
Line 56, "fed" should read -- feed --.
Line 64, "alone" should read -- along --.

Signed and Sealed this

Twenty-third Day of October, 2001

Attest:

NICHOLAS P. GODICI
Attesting Officer  Acting Director of the United States Patent and Trademark Office